(12) United States Patent
Leblanc

(10) Patent No.: US 7,186,067 B2
(45) Date of Patent: Mar. 6, 2007

(54) FASTENER WITH ATTACHED PIVOTABLE HANDLE

(75) Inventor: Norman Leblanc, Harrisburg, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 141 days.

(21) Appl. No.: 10/847,261

(22) Filed: May 17, 2004

(65) Prior Publication Data

US 2005/0254921 A1    Nov. 17, 2005

(51) Int. Cl.
F16B 23/00 (2006.01)
F16B 35/06 (2006.01)
B26B 1/08 (2006.01)

(52) U.S. Cl. .................. 411/409; 411/408; 411/368; 74/543; 81/177.5; 30/335

(58) Field of Classification Search ............... 411/409, 411/408, 368, 532, 533, 546, 147; 74/547, 74/551.3; 81/177.5, 436, 440, 450, 458; 403/408.1, 17; D8/99; 30/335
See application file for complete search history.

(56) References Cited

U.S. PATENT DOCUMENTS

| | | | |
|---|---|---|---|
| 236,105 A | 12/1880 | Stohlmann | |
| 398,978 A * | 3/1889 | Scheer | 16/445 |
| 1,476,007 A * | 12/1923 | Rude | 81/436 |
| 1,562,951 A | 11/1925 | Franz, Jr. | |
| 2,697,244 A * | 12/1954 | Lincke | 16/419 |
| 2,798,404 A | 7/1957 | Schaefer et al. | |
| 3,043,471 A * | 7/1962 | Coulson et al. | 220/212.5 |
| 3,863,693 A * | 2/1975 | Carriker | 81/177.6 |
| 4,165,713 A * | 8/1979 | Brawner et al. | 119/794 |
| 4,419,029 A | 12/1983 | Wenzel | |
| 4,575,940 A | 3/1986 | Wenzel | |
| 5,022,156 A | 6/1991 | Kallens et al. | |
| 5,585,578 A | 12/1996 | Shimotori | |
| 5,590,575 A * | 1/1997 | Ludy | 81/177.5 |
| 5,711,054 A * | 1/1998 | Salice | 16/382 |
| 6,095,018 A * | 8/2000 | Schuster | 81/177.5 |
| 6,223,439 B1 | 5/2001 | Wonderley | |
| 6,338,649 B1 | 1/2002 | Smith | |
| D453,461 S | 2/2002 | Chen | |
| 6,532,670 B1 | 3/2003 | Berns | |
| 6,837,511 B1 * | 1/2005 | Johnson, III | 280/511 |
| 2003/0072636 A1 * | 4/2003 | Boe | 411/409 |

\* cited by examiner

*Primary Examiner*—Katherine Mitchell
(74) *Attorney, Agent, or Firm*—Dennis J. Williamson; Moore & Van Allen PLLC

(57) ABSTRACT

The fastener includes a shaft having a first end and a second end, the first end of the shaft includes a threaded portion. A head is connected to the second end of the shaft and a flange extends radially outward from the head. A handle is connected to the head and the handle is positioned against the flange the first position and generally upstands from the head in the second position. The handle moves between the first position and a second position. The fastener may be used to fasten halves of a separable housing.

20 Claims, 2 Drawing Sheets

FASTENER WITH ATTACHED PIVOTABLE HANDLE

BACKGROUND

1. Technical Field

The present invention relates to fasteners. In particular, the present invention relates to a fastener for holding together two halves of a separable housing.

2. Background Information

Several types of fasteners are known in the art for holding together two halves of a separable housing. These fasteners are useful for quickly assembling and disassembling the halves of the housing, such as a utility knife having replaceable blades. Assembly of the housing, using the fasteners, may be accomplished with or without an additional tool to tighten or loosen the fastener.

Typically, toolless fasteners include a screw or a bolt having a threaded portion and a nut secured to the threaded portion on the exterior of the housing to hold the halves together. Assembly of the housing may be accomplished by tightening the nut onto the threaded portion by hand, using the thumb and fingers. A tool, such as a wrench may also be used to rotate the nut onto or off of the threaded screw or bolt. At least one disadvantage of the nut-type fastener is that the nut protrudes from the surface of the housing, potentially interfering with the use of the housing. For example, the housing may be the shell of a hand tool, such as a utility knife, wherein the protruding nut interferes with the hand grip.

Another type of fastener for assembling a separable housing requires the use of a separate tool in order to secure or loosen the halves of the housing. For example, the fastener may have a screw-type assembly having a threaded portion, adapted to engage the housing and requiring a separate tool to rotate the fastener within the housing. The separate tool may be a screwdriver or coin that fits into a slot in the head of the fastener. Requiring a separate tool to open and close a housing, such as for replacing a utility knife blade, is a disadvantage for ease and speed of changing the blades.

Therefore, it is an object of the present invention to provide a fastener that securely fastens together halves of a separable housing, such as a utility knife, and wherein the fastener provides for toolless assembly and disassembly of the housing without interfering with the use of the housing.

BRIEF SUMMARY

In order to alleviate one or more shortcomings of the prior art, a fastener and a method for fastening halves of a separable housing are provided herein.

In one aspect of the present invention, a fastener is provided. The fastener includes a shaft having a first end and a second end, the first end of the shaft includes a threaded portion. A head is connected to the second end of the shaft and a flange extends from the head. A handle is connected to the head and the handle is positioned against the flange the first position and generally upstands from the head in the second position. The handle moves between the first position and a second position.

In another aspect of the present invention, a method for fastening a separable knife housing is provided. The method includes providing a fastener having a shaft that is threaded at a first end and a head connected to the shaft. The method further includes providing a handle on the head, the handle disposed for pivotal movement between a first position wherein the handle rests adjacent a flange extending radially from the head and a second position wherein the handle extends at least partially upwardly from the head, providing a separable knife housing having a first half and a second half, the halves being configured to be held together with the fastener, aligning the halves to be joined together; positioning the handle in the second position; and rotating the handle to tighten the first and second halves with respect to each other via said fastener.

In another aspect of the present invention, a fastener is provided. The fastener includes a head having a top surface, a bottom surface, and a side surface formed between the top and bottom surfaces, the side surface having a groove formed therein. The fastener further includes a shaft connected to the head, the shaft having a first end and a second end and a handle connected to the head. The handle is movable between a first position and a second position wherein the handle is positioned in the groove in the first position and wherein the handle extends radially from the head in the second position.

In another aspect of the present invention, a device is provided. The device includes a separable housing having a first half and a second half and a fastener adapted to engage and removably join the housing. The fastener includes a head having a top surface, a bottom surface, and a side surface formed between the top and bottom surfaces, the side surface having a groove formed therein, a shaft extending from the bottom surface of the head, the shaft having a first end and a second end and a handle connected to the head. The handle is pivotable between a first position and a second position wherein the handle is positioned in the groove in the first position and wherein the handle extends radially from the head in the second position.

Advantages of the present invention will become more apparent to those skilled in the art from the following description of the preferred embodiment of the invention which has been shown and described by way of illustration. As will be realized, the invention is capable of other and different embodiments, and its details are capable of modification of various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
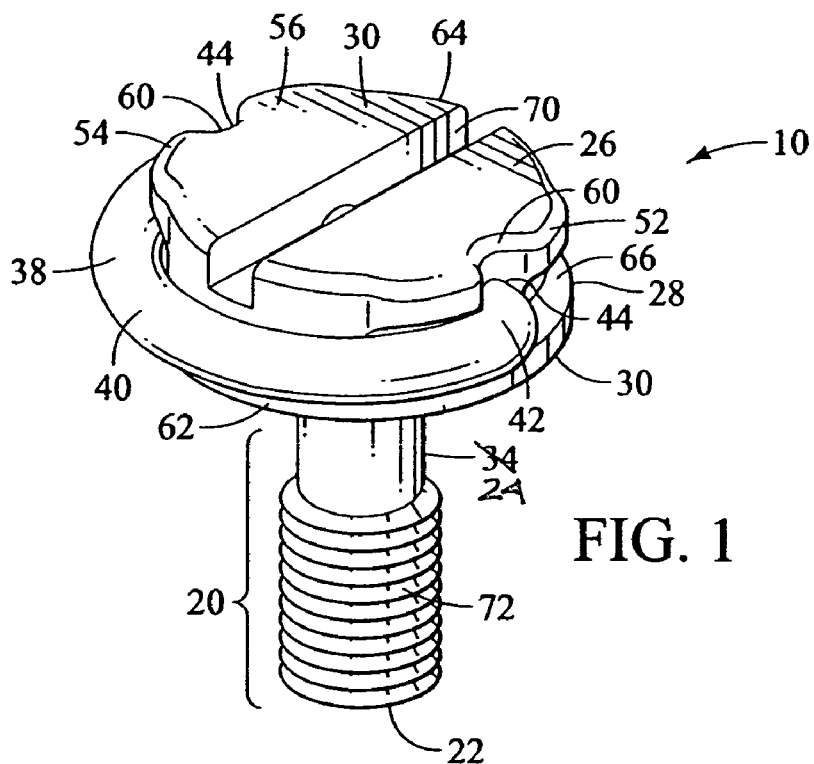
FIG. 1 is a side elevational view of a fastener in accordance with the present invention.
Figure 2:
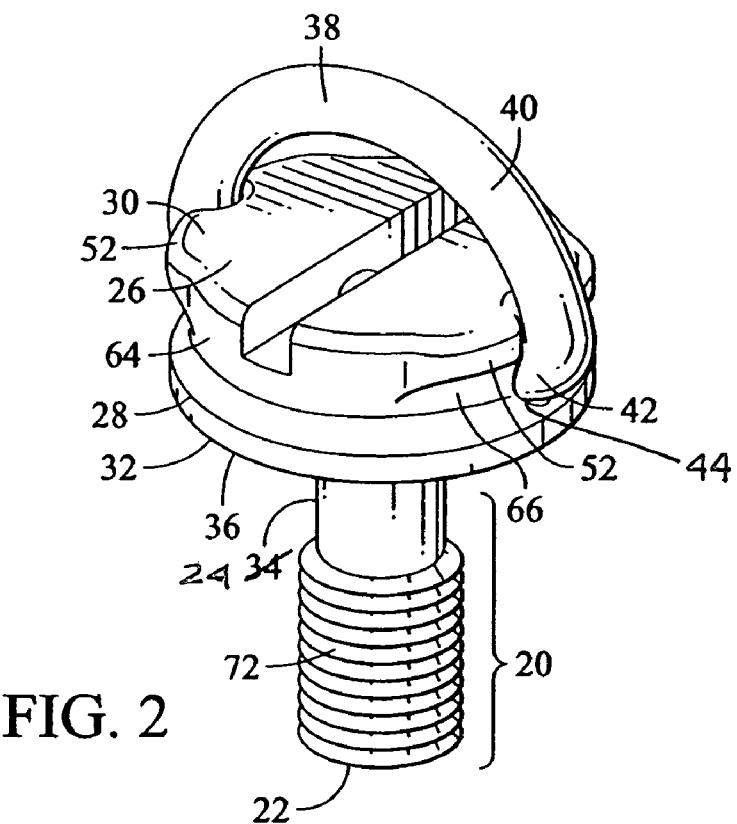
FIG. 2 is another side elevational view of the fastener in accordance with the present invention.

A preferred embodiment of the fastener 10 of the present invention is shown in FIGS. 1 and 2. The fastener 10 includes a shaft 20 having a first end 22 and a second end 24. A head 26 is connected to the second end 24 of the shaft 20.

The head 26 further includes an annular flange 28 that extends radially from the head 26. In a preferred embodiment, the head 26 and the flange 28 are generally cylindrical. By way of example, the head 26 may include planar upper and lower surfaces, 30 and 32. Alternatively, the head 26 may include a rounded upper surface 30. However, the head 26 may be of any shape known to one of skill in the art. As shown in FIGS. 1 and 2, the flange 28 extends radially from the head 26 and preferably the flange 28 includes a bottom surface 38 extending from the lower surface 36 of the head 26. By way of example, the head 26 and the shaft 20 may be formed from plastic materials. However, the head 26 and the shaft 20 may be formed from any material.

The head 26 further includes a handle 38 that is operably connected to the head 26. In a preferred embodiment, the handle 38 may include an arcuate loop 40 having ends 42 bent inward toward each other. Preferably, the handle 38 is connected to the head 26 by insertion of the ends 42 of the handle 38 into a pair of openings 44 formed in the head 26. The openings 44 may be formed from a channel extending through the head 26 and adapted to receive ends 42 of the handle 38. However, the handle 38 may be connected to the head 26 by any means known to one of skill in the art. In a preferred embodiment of the present invention, the openings 44 are on opposite sides of the cylindrical head 26 and sized to receive the ends 42 and to allow the ends 42, and the handle 38, to pivot within the openings 44. The handle 38 may pivot between a first position shown in FIG. 1 and a second position shown in FIG. 2. Preferably the handle 38 may be resistively retained in the first or the second position as described below, although the handle 38 may be retained at any position between the first and the second positions. The handle 38 may be formed from any material known to one of skill in the art. By way of example, the handle 38 may be formed from steel.

Figure 3:
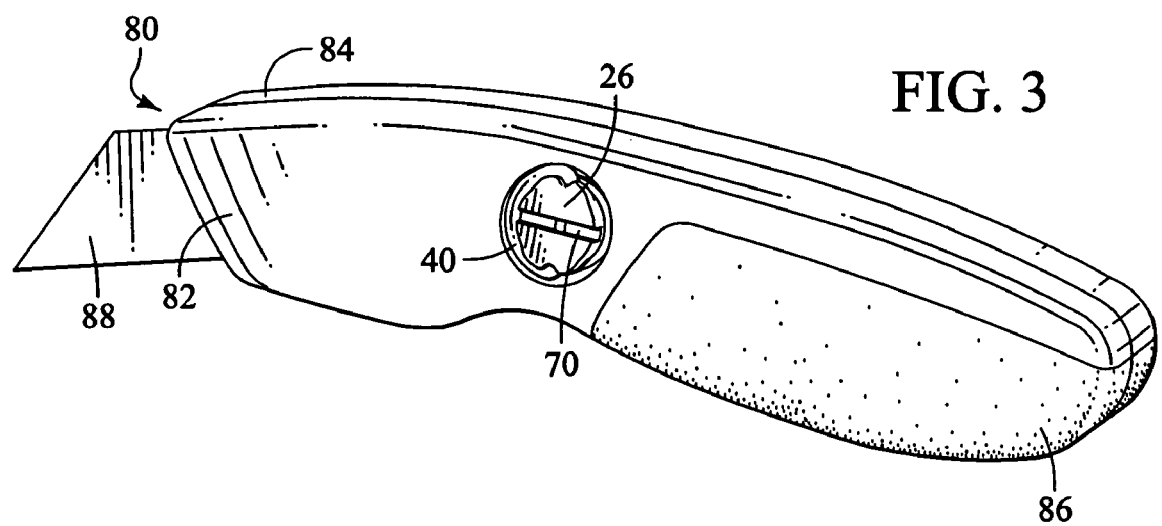
FIG. 3 is a perspective view of a utility knife including the fastener shown in FIG. 1.

In the first position, the handle 38 is removably positioned against the flange 28. The handle 38 may be secured against the flange 28 by protrusions 52 extending from the head 26 as can be seen in FIG. 2. The protrusions 52 may extend from a portion the upper surface 30 of the head 26. In the illustrated embodiment the protrusions 52 extend radially from the upper surface 30 of head 26. The protrusions 52 may extend from the upper surface 30 on both sides 54 and 56 of recesses 60 formed in the protrusions 52 above the openings 44 formed in the head 26. Thus, when the handle 38 is in the first position with respect to the head 26, the handle 38 is removably secured between the flange 28 and the protrusions 52. The protrusions 52 provide resistance against the handle 38 from moving from the first position to another position. The handle 38 may removably snap fit into a groove 66 formed between the protrusions 52 and the flange 28. The handle 38 may be removably secured in the first position on either a first side 62 or a second side 64 of the head 26. When the handle 38 is in the first position shown in FIG. 1, the handle 38 does not interfere with the utility of the device having a separable housing by protruding from the housing such that the handle 38 interferes with grasping the device. In a preferred embodiment of the present invention, the handle 38 in the first position may be recessed from the work surface of the housing. For example, as shown in FIG. 3, when the fastener 10 is used to secure the separable housing of a utility knife, the handle 38 may be in a first position, recessed from surface of the knife housing or nearly so, allowing a user to readily grasp the hand grip 86 of the knife without substantial interference from the handle 38.

Figure 4:
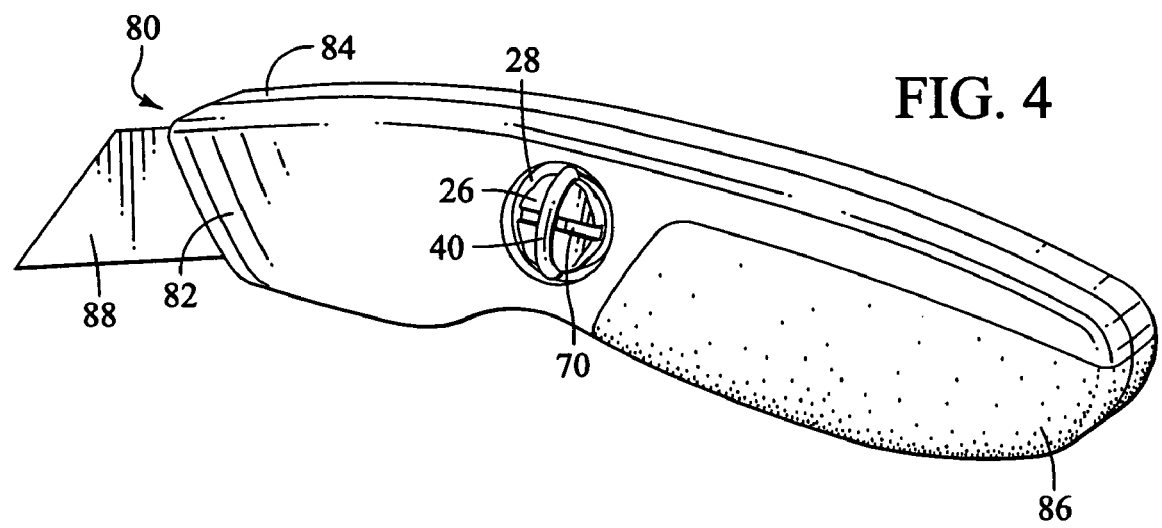
FIG. 4 is a perspective view of a utility knife including the fastener shown in FIG. 2.

In the second position, shown in FIG. 2, the handle 38 is removably secured in the recesses 60 formed in the head 26. The recesses 60 can best be seen in FIG. 1. Above each opening 44 a semicircular recess 60 may be formed in the protrusion 52 in the head 26 of the fastener 10. The recesses 60 are adapted to receive the handle 38 and removably secure the handle 38 in the second position. When the handle 38 is in the second position, the fastener 10 may be rotated by a hand grasping the handle 38 to tighten or loosen the fastener 10 in a separable housing. The recesses 60 removably retain the handle 38 by snap-fit reception of the handle 38 into the recesses 60 in the second position for easy rotation of the fastener 10. Of course, the handle 38 may be used in additional positions for rotating the fastener 10 other than when the handle 38 is in the first position wherein the handle 38 is removably secured against the flange 28. FIG. 4 shows the handle 38 in the first position for use with the separable halves of a utility knife.

Optionally, the head 26 may include a slot 70 that is adapted to receive a tool such as a screw driver or a coin to rotate the fastener 10. For example, when the handle 38 is in the first position, a tool may be engaged in the slot 70 to rotate the fastener 10 to tighten or loosen the fastener 10 in the separable housing.

The shaft 20 may be generally cylindrical as shown in FIGS. 1 and 2. Preferably, the first end 22 has a greater circumferential diameter than the second end 24 of the shaft 20. A clip (not shown) may be connected to the second end 24 of the shaft 20 to secure the fastener 10 with a half of the separable housing when the halves of the housing are separated. For example, when the fastener 10 is used with a utility knife, the clip may be used to secure the fastener 10 to a first half of the utility knife when the second half of the utility knife is removed after loosening the fastener 10 by rotating the handle 38 in order to change knife blades.

The shaft 20 further comprises at least one helical thread 72 at the first end 22 of the shaft 20. The thread 72 may be any type of thread known to one of skill in the art. The thread 72 is adapted to mate with a threaded socket (not shown) mounted on one half of the separable housing such that during rotation of the fastener 10 the thread engages or disengages the half of the separable housing 10, respectively tightening or loosing the halves of the separable housing.

As described above and shown in FIGS. 3 and 4, a preferred embodiment of the fastener 10 may be used to secure the halves of a separable housing, such as a utility knife 80. In use, the fastener 10 is engaged with a first half 82 of the utility knife 80. A second half 84 of the knife 80 is aligned with the first half 82 and the threads 72 on the first end 22 of the shaft 20 of the fastener 10 engage the threads (not shown) formed in an opening in the second half 84 of the knife 80. As shown in FIG. 4, the handle 40 may be secured in the second position by fitting with the pair of recesses 60 formed in the head 26 wherein the handle 38 extends axially from the head 26. In the second position, the handle 40 may be grasped by the user to rotate the fastener 10 to secure the first half 82 to the second half 84 of the utility knife 80 via engagement of the threads 72 on the shaft 20 with the threads on the second half 84. Repeated rotation of the fastener 10 using the handle 38 in the second position brings the halves 82 and 84 together such that the knife 80 may be used for cutting, etc. When the handle 38 is rotated in the opposite direction, the threads 72 of the shaft 20 disengage from the threads of the second half 84 and upon complete disengagement of the threads, the halves 82 and 84 may be completely separated. By way of example, this engagement and disengagement using the fastener 10 with the halves 82 and 84 allows the user to easily exchange a blade 88.

As shown in FIG. 3, when the halves 82 and 84 are engaged for use of the utility knife 80, the handle 40 may be placed in the first position wherein the handle 38 fits against the flange 28. In the first position, the handle 40 of the fastener 10 does not interfere with the use of the knife 80. In a preferred embodiment of the present invention, the handle 40 and the head 26 of the fastener 10 may be recessed from the surface of the first half 82 of the utility knife 80.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. It is therefore intended that the foregoing detailed description be regarded as illustrative rather than limiting, and that it be understood that it is the following claims, including all equivalents, that are intended to define the spirit and scope of this invention.

The invention claimed is:

1. A fastener comprising:
   a shaft having a first end and a second end, said first end having a threaded portion;
   a head connected to said second end of said shaft;
   a flange connected to and extending radially outward from said head;
   a handle operably connected to said head, said handle being movable between a first position and a second position; and
   at least one protrusion extending radially from said head, said at least one protrusion forming a groove together with said flange adapted to removably secure said handle in said first position;
   wherein a substantial portion of said handle is positioned against said flange in said first position and said handle is generally upstanding from said head in said second position.

2. The fastener of claim 1 wherein said handle is removably secured with said head.

3. The fastener of claim 1 wherein said handle comprises an arcuate portion and two bent ends forming a D-shaped loop, said loop lying substantially concentrically with said shaft when in said first position.

4. The fastener of claim 1 further comprising a pair of openings formed in said head, said openings being sized to receive said handle for pivotal mounting of said handle.

5. The fastener of claim 1 wherein said head is generally cylindrical.

6. The fastener of claim 1 wherein said first end of said shaft comprises a greater outside diameter than said second end of said shaft.

7. The fastener of claim 1 wherein said head further comprises a slot adapted to receive a tool.

8. A fastener comprising:
   a head having a top surface, a bottom surface, and a side surface formed between said top and bottom surfaces, said side surface having a groove formed therein, said groove extending about the circumference of the head;
   a shaft connected to said head, said shaft having a first end and a second end; and
   a handle connected to said head, said handle being movable between a first position and a second position;
   wherein a substantial portion of said handle is positioned in said groove in said first position and wherein said handle extends from said head in said second position.

9. The fastener of claim 8 further comprising at least one protrusion extending from said head, said at least one protrusion forming a portion of said groove.

10. The fastener of claim 8 wherein said first end of said shaft further comprises a threaded portion.

11. A device comprising:
    a separable housing having a first half and a second half;
    a fastener adapted to engage and removably join said housing; said fastener comprising:
    a head having a top surface, a bottom surface, and a side surface formed between said top and bottom surfaces, said side surface having a groove formed therein, said groove extending about the circumference of the head;
    a shaft extending from said bottom of said head, said shaft having a first end and a second end; and
    a handle connected to said head, said handle being pivotable between a first position where a substantial portion of the handle is positioned in said groove and a second position;
    wherein said handle is positioned in at least partially said groove in said first position and wherein said handle is generally upstanding from said head in said second position.

12. The device of claim 11 further comprising at least one blade being secured in said separable housing when said fastener joins said housing.

13. The device of claim 11 further comprising a hand grip on said housing, said hand grip being substantially free from interference from said handle in said first position.

14. A fastener comprising:
    a shaft having a first end and a second end, said first end having a threaded portion;
    a head having a groove formed therein and a bottom surface connected to said second end of said shaft;
    a flange extending radially from said bottom surface of said head, said flange forming a portion of the groove;
    a handle operably connected to said head, said handle being movable between a first position and a second position;
    wherein a substantial portion of said handle is positioned in said groove and against said flange in said first position and said handle is generally upstanding from said head in said second position.

15. A fastener comprising:
    a head having a top surface, a bottom surface, and a side surface formed between said top and bottom surfaces, and a flange extending radially from said bottom surface, said side surface having a groove formed therein and said flange forming a portion of said groove;
    a shaft connected to said head, said shaft having a first end and a second end;
    a handle connected to said head, said handle being movable between a first position and a second position;
    wherein said handle is positioned in said groove in said first position and wherein said handle extends radially from said head in said second position.

16. A device comprising:
    a separable housing having a first half and a second half;
    a fastener adapted to engage and removably join said housing; said fastener comprising:
    a head having a top surface, a bottom surface, and a side surface formed between said top and bottom surfaces, and a flange extending radially from said bottom surface, said side surface having a groove formed therein and said flange forming a portion of said groove;
    a shaft extending from said bottom of said head, said shaft having a first end and a second end;
    a handle connected to said head, said handle being pivotable between a first position and a second position;

wherein said handle is positioned in at least partially said groove in said first position and wherein said handle is generally upstanding from said head in said second position.

17. A fastener comprising:

a shaft having a first end and a second end, said first end having a threaded portion;

a head connected to said second end of said shaft;

a flange connected to and extending radially outward from said head;

a handle operably connected to said head, said handle being movable between a first position and a second position; and a pair of recesses formed in said head, said recesses being formed to engage and removably secure said handle in said second position;

wherein a substantial portion of said handle is positioned against said flange in said first position and said handle is generally upstanding from said head in said second position.

18. A method of fastening a separable knife housing comprising:

providing the fastener with handle as claimed in claim 1, providing a separable separable knife housing having at least a first half and a second half, said halves being configured to be held together with said fastener;

aligning said halves to be joined together; positioning said handle in said second position; and rotating said handle to tighten said first and second halves with respect to each other via said fastener.

19. The method of claim 18 further comprising providing at least one replaceable blade, said at least one blade being secured in said knife housing when said halves are tightened together by said fastener.

20. The method of claim 18 further comprising providing a hand grip on said knife housing, said hand grip being substantially free from interference from said handle in said first position.

* * * * *